W. A. BANFILL.
PHOTOGRAPHIC PRINTING AND RETOUCHING FRAME.
APPLICATION FILED JUNE 12, 1912.
1,096,345.
Patented May 12, 1914.
2 SHEETS—SHEET 2.
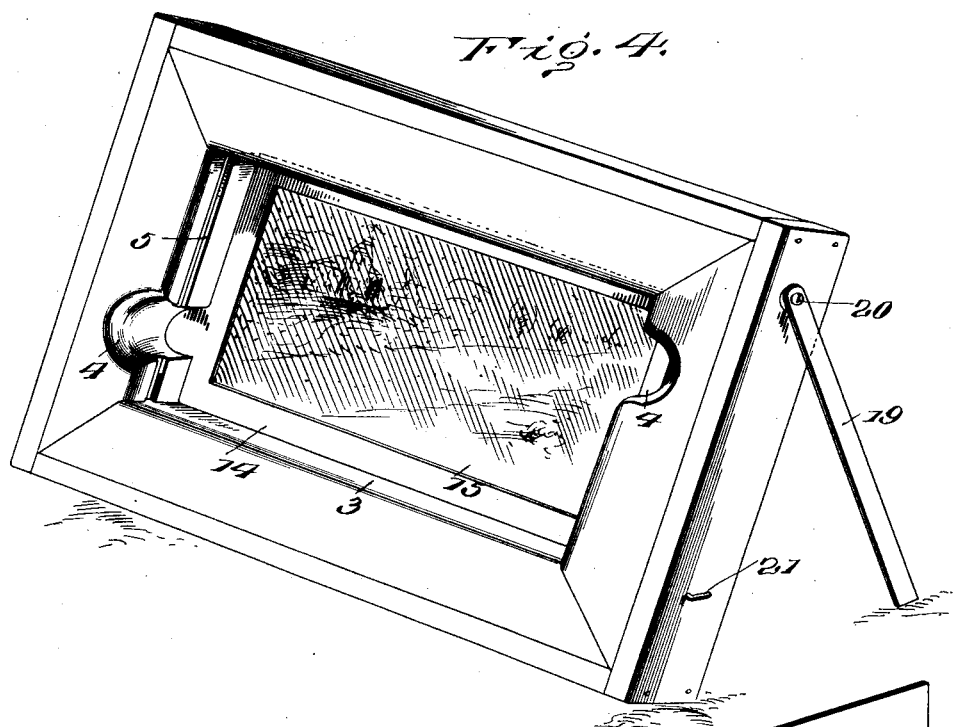
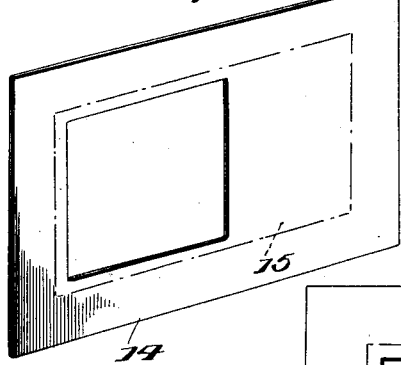
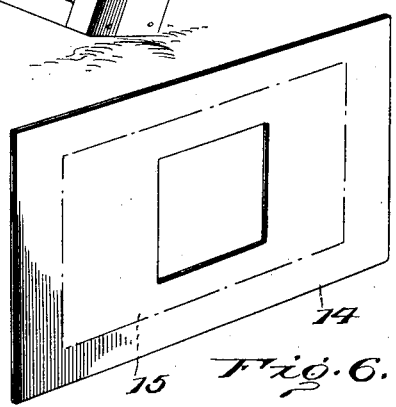
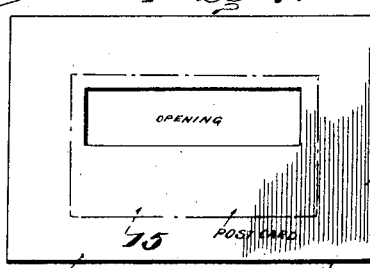
Witnesses
Inventor
W. A. Banfill.
By
Attorneys.

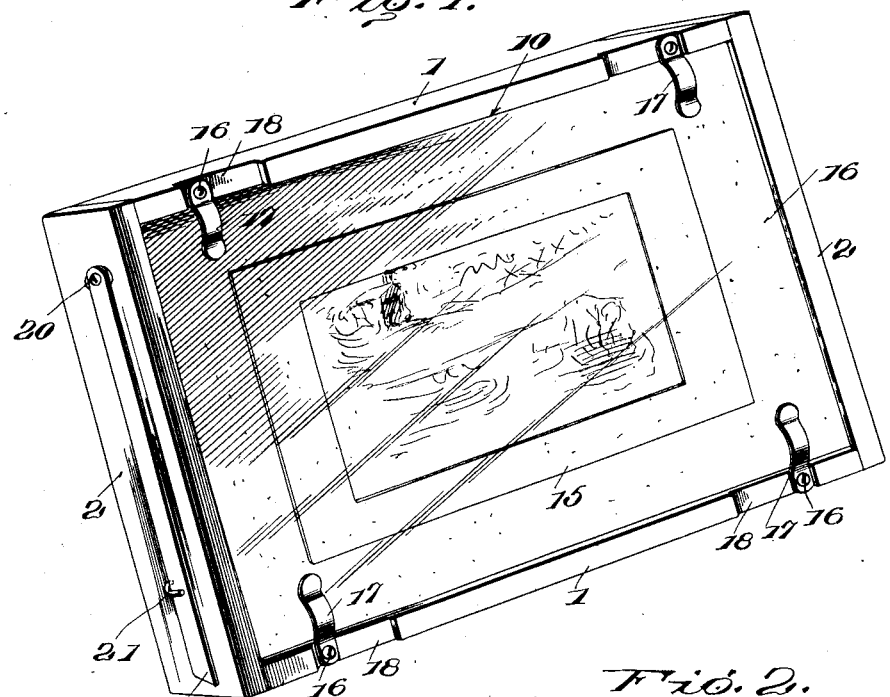

UNITED STATES PATENT OFFICE.

WILLIAM A. BANFILL, OF IPSWICH, MASSACHUSETTS.

PHOTOGRAPHIC PRINTING AND RETOUCHING FRAME.

1,096,345.   Specification of Letters Patent.   Patented May 12, 1914.

Application filed June 12, 1912. Serial No. 703,295.

*To all whom it may concern:*

Be it known that I, WILLIAM A. BANFILL, citizen of the United States, residing at Ipswich, in the county of Essex and State of Massachusetts, have invented certain new and useful Improvements in Photographic Printing and Retouching Frames, of which the following is a specification.

This invention has as its object to provide a novel combined photographic printing and retouching frame.

It is one aim of the invention to provide a photographic printing frame so constructed that any desired number of prints, which are exact duplicates, can be made from any negative.

Another aim of the invention is to provide a printing frame so constructed that any number of prints may be made from a negative positioned therein, without disturbing the negative and without the necessity of rearranging the same after each print has been made.

The invention further aims to provide a printing frame by the use of which duplicate prints can be made much more rapidly than by the use of the ordinary frame, the frame being particularly well adapted, for this reason, for use in printing post cards.

Another feature of the invention resides in so constructing the frame that prints may be made from the whole or any portion of a film, the frame for this reason being desirable for use in making prints from negatives which have been light struck. In this respect the invention also contemplates constructing the frame in such manner that the negative from which prints are to be made, may be positioned at various angles with relation to the sight opening of the mask used in the frame so that a negative from a camera which has been tilted at the time of exposure, may be printed from with practically no loss of the field covered by the negative.

Another aim of the invention is to provide a printing frame which may be employed in making prints from negatives of various sizes without waste of the photographic paper.

The frame embodying the present invention is provided with a number of masks having sight openings of various sizes and outline, and the frame is so constructed that a negative from which prints are to be made may be arranged in various positions against the masks and in various positions with relation to the paper receiving socket of the frame.

The invention further aims to provide a frame of the class mentioned which will be adapted to hold a film perfectly flat and in any desired position therewithin while an exposed sensitized sheet is being removed and a new sheet is being substituted therefor. In this respect, the frame embodying the present invention presents a marked advantage over the ordinary frame, inasmuch as in the use of the ordinary film, the frame is liable to curl as soon as the back is released.

The invention also aims to provide a printing frame, the back of which is in one piece and may be readily and quickly removed and replaced, the use of the ordinary hinged back and the disadvantages resulting from its use, being obviated.

Another aim of the invention is to provide a photographic printing frame particularly well adapted for use in printing by artificial light, the frame being so constructed that sensitized sheets may be readily and quickly inserted therein and removed therefrom, and while not unnecessarily thick at its sides, will be adapted to stand alone on one or more of its edges, it being in this manner adapted to be conveniently disposed upon a shelf or other support in position for exposure and to stand alone without the necessity of providing a support at its back.

The invention still further aims to provide a photographic printing frame which may be readily and conveniently converted into a retouching frame.

Further the invention aims to provide a photographic retouching frame so constructed that the film or plate to be retouched will be held perfectly flat and against displacement, in any direction.

Another object of the invention is to provide a retouching frame in which the film or plate to be retouched will be held perfectly flat and will be exposed at both sides so that when presented toward the light the photographer performing the retouching operation may view all portions of the negative and accomplish his work in a more perfect manner than by the use of the retouching frames of the ordinary type.

A further aim of the invention is to provide a printing frame in which the glass against which the film is disposed will be yieldably held in place as will also the back which is disposed against the back of the sensitized sheet so that the negative and sheet will be held perfectly flat and in contact throughout their entire surface.

Another feature of the invention resides in so constructing the frame as to adapt the same for the use of a one-piece back carrying the usual swiveled spring-clip, and in this connection the invention contemplates forming opposite sides of the frame with notches through which the ends of the said clip may pass prior to engagement in the usual grooves provided for the reception of the said ends when holding the back in place, these notches serving also to permit of the ready removal of a sensitized sheet after exposure.

Another aim of the invention is to provide supports upon the frame adapted to hold the frame firmly at any desired angle when the same is being used as a retouching frame.

The invention also contemplates so constructing and arranging these supports that they may be employed in supporting the frame should it be used for daylight printing.

For a full understanding of the invention reference is to be had to the following description and accompanying drawing, in which:—

Figure 1 is a perspective view of the printing and retouching frame embodying the present invention. Fig. 2 is a horizontal sectional view therethrough. Fig. 3 is a vertical transverse sectional view on the line 3—3 of Fig. 2. Fig. 4 is a perspective view showing the frame in use as a retouching frame. Figs. 5, 6 and 7 are perspective views of masks of various forms employed in connection with the frame.

Corresponding and like parts are referred to in the following description and indicated in all the views of the accompanying drawings by the same reference characters.

In the drawings the frame is illustrated as including sides 1, and ends 2, and while the said sides and ends of the frame are preferably built up, as shown in the several figures of the drawings, they will for convenience' sake, be herein described, as if integral. The said sides 1 and ends 2 define the socket of the frame which receives the sensitized sheet and the back of the frame. The end-walls of this socket are formed each with a notch 4 and these notches as illustrated in Fig. 4 of the drawings, are preferably located at diametrically opposite corners of the socket. Each end-wall of the socket is further formed with a groove 5 which intersects the respective socket 4. The back of the frame is indicated by the numeral 6 and is removably fitted within the socket 3, in the manner shown in Figs. 2 and 3 of the drawing, that face of the back which engages against the sensitized sheet being covered with a sheet 7 of cloth or like material. It will be observed that the back 6 is in one piece and is not hinged as are the backs of the ordinary printing frames, and it is held within the socket 3 by means of the usual leaf-spring clip which is swiveled as at 9 at the center of the back. When the clip is to be positioned so as to hold the back in place within the socket it is swung in position extending diametrically across the back and its ends are pressed downwardly and enter the notches 4. The clip is then turned in a reverse direction so as to position its ends in the groove 5, in the manner shown in Fig. 2 of the drawings.

The negative and mask-receiving socket of the frame is indicated in general by the numeral 10 and is formed by rabbeting the rear face of each end and side of the frame, the rearwardly presented walls of the rabbets being indicated by the numeral 11 and the inwardly presented walls being indicated at 12. By referring to Figs. 2 and 3 of the drawings it will be observed that the rabbets in the sides and ends of the frame are relatively shallow but extend practically the entire width of the frame members in which they are formed. It will thus be apparent that the socket 10 is of greater width and length than the socket 3, and the reason for so relatively proportioning these sockets will be presently made apparent. For convenience in further describing the frame, it may be stated that in the drawings the numeral 13 indicates the sensitized sheet which is to be exposed, 14 a mask, 15 the negative from which the print is to be made and 16 a sheet of glass to be disposed against the negative. In order that the mask, negative and glass 16 may be securely held within the socket 10, clips are provided, each of which is in the form of a leaf-spring 17 pivoted as at 16 in the bottom of a shallow recess 18 formed in the rear face of the frame, these clips being bowed as illustrated in Figs. 1 and 3 of the drawings, and being of a length substantially equal to the length of the respective recess 18. It will be observed that two of the clips 17 are provided upon each side 1 of the frame and that the clips may be swung to assume the positions shown in Fig. 1 of the drawings or may be swung to position within their respective recesses.

The manner of using the frame in making prints is as follows:—The back 6 is removed and the frame is placed back down upon a table or any other suitable support, after which the mask 14, which may be of any desired form, and have any form of sight opening suitable for the negative which is to be printed from, or the print which is to be made, is disposed within the socket 10 with its edge portions resting upon the bottom walls 11 of the rabbets formed in the said socket. The negative from which the print is to be made is then disposed upon the mask 14 and is positioned thereon to suit the tests of the photographer. After the negative has been properly positioned the glass 16 is placed within the socket and held firmly in place while the clips 17 are swung to assume the positions shown in Fig. 1 of the drawings. The frame is then inverted and the back 6 is placed within the socket 3 and the spring-clip 8 is moved to position to hold the back in place, the sensitized sheet or post card upon which the print is to be made having its face disposed within the socket 3 and against the mask 14. The frame is then manipulated in the ordinary manner for exposure. After one exposure has been made and should it be desired to make another or several, from the same negative, the back 6 is removed as is also the exposed sensitized sheet 13. The removal of the sheet, however, does not in any way disturb or release the negative 15 and no further attention need be paid to the adjustment of this negative, the next sheet to be exposed being merely disposed in the manner above described, in the socket 3. It will be apparent at this point that any number of duplicate prints may be made from a negative arranged as described, and that such prints may be made much more rapidly than by the use of the ordinary printing frame. It will also be apparent that inasmuch as the socket 3 is of a size to receive the standard sensitized post card, no care need be exercised in arranging the card within the socket. It will further be apparent that by providing a mask the sight opening of which is so located that it will have a certain definite relation to the socket opening 3, any number of post cards may be printed from a negative arranged within the socket 10, all of which post cards will be exact duplicates of each other as far as the location of the printed area is concerned.

It will be observed that the clips 17 exert yielding pressure against the glass 16 and that like pressure is exerted against the back 6 by the clip 8 and for this reason the film, mask, and sensitized sheet are held perfectly flat during the printing operation.

In order to provide means for supporting the frame in inclined position, when the same is being used as a retouching frame, standards 19 are pivoted at their upper ends as at 20 to the ends 2 of the frame and are arranged to rest at their lower ends upon a surface upon which the frame is disposed and these standards, when not in use, are held out of the way and against the outer faces of the said frame by means of hooked fingers 21 upon the said end of the frame. When the frame is to be used for a retouching frame the negative is arranged therewithin in the manner above described, either with or without the mask and the back 6 of the frame is removed and the frame is disposed in the position shown in Fig. 4 of the drawings. In this manner, the negative will be exposed to view in the socket opening 3 and in convenient position for spotting and retouching. It will be understood that inasmuch as both sides of the negative are exposed when the frame is so arranged, the details of the negative will stand out clear to view and the operator can readily determine the effects of the retoucher. It will also be understood that not only are the standards 19 adapted to support a frame in position for retouching of the film or plate arranged therein, but by reversing the standards they may be adapted to support the frame in position for daylight printing.

Having thus described the invention what is claimed as new is:—

1. A combined printing and retouching frame having a socket in each of its faces, the said sockets being in communication with each other, a transparent sheet removably fitted in one of the sockets and constituting a bottom common to both of the sockets, and a back removably fitted in the other socket and resting against the said sheet.

2. A combined photographic printing and retouching frame having sockets in its opposite faces, the said sockets being in communication and one of the sockets being of less dimensions than the other, a transparent sheet removably fitted in the larger socket and constituting a bottom common to both of the sockets, the other socket being adapted to receive a sensitized sheet, and a back removably fitted in the last mentioned socket and resting against the transparent sheet.

In testimony whereof I affix my signature in presence of two witnesses.

WILLIAM A. BANFILL. [L. s.]

Witnesses:
 PERCY A. ROGERS,
 THOMAS SEAKILL.

---

Copies of this patent may be obtained for five cents each, by addressing the "Commissioner of Patents, Washington, D. C."